United States Patent
Baier et al.

(10) Patent No.: US 11,300,154 B2
(45) Date of Patent: Apr. 12, 2022

(54) METHOD FOR PRODUCING A BALL STUD

(71) Applicant: AUDI AG, Ingolstadt (DE)

(72) Inventors: Sebastian Baier, Poppenhausen (DE);
Guido Fessel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 357 days.

(21) Appl. No.: 16/618,507

(22) PCT Filed: Jun. 4, 2018

(86) PCT No.: PCT/EP2018/064607
§ 371 (c)(1),
(2) Date: Dec. 2, 2019

(87) PCT Pub. No.: WO2019/001906
PCT Pub. Date: Jan. 3, 2019

(65) Prior Publication Data
US 2020/0124085 A1 Apr. 23, 2020

(30) Foreign Application Priority Data

Jun. 28, 2017 (DE) .................. 10 2017 210 976.9

(51) Int. Cl.
*F16C 11/06* (2006.01)
*B23P 15/00* (2006.01)

(52) U.S. Cl.
CPC .......... *F16C 11/0685* (2013.01); *B23P 15/00* (2013.01); *B23P 2700/11* (2013.01);
(Continued)

(58) Field of Classification Search
CPC .............. F16C 11/0685; F16C 2220/46; F16C 2220/60; F16C 2223/18; F16C 2223/16;
(Continued)

(56) References Cited

U.S. PATENT DOCUMENTS 2,733,085 A * 1/1956 Latzen ................ F16C 11/0628
403/135
3,221,527 A * 12/1965 Roehrs ................ F16C 11/0685
72/199
(Continued)

FOREIGN PATENT DOCUMENTS

CN 101896632 A 11/2010
CN 102900754 A 1/2013
(Continued)

OTHER PUBLICATIONS

Chinese Office Action dated Dec. 1, 2020, in connection with corresponding CN Application No. 201880041066.1 (14 pp., including machine-generated English translation).
(Continued)

*Primary Examiner* — Lawrence Averick
(74) *Attorney, Agent, or Firm* — Maier & Maier, PLLC

(57) ABSTRACT

Method for producing a ball stud with a joint ball and a shank, wherein the shank includes at least a neck region adjoining the joint ball and a fastening section opposite the joint ball, characterized by the steps: a) plastically shaping a semi-finished ball stud product; b) mechanically machining the semi-finished ball stud product; c) rolling the surface of the joint ball; d) thermochemically hardening the surface of the semi-finished ball stud product; e) removing the surface-hardened layer at least in the neck region and/or the fastening section; f) oxidizing the semi-finished ball stud product; g) polishing the joint ball.

20 Claims, 1 Drawing Sheet

(52) U.S. Cl.
CPC ...... *F16C 2220/46* (2013.01); *F16C 2220/60* (2013.01); *F16C 2223/18* (2013.01)

(58) Field of Classification Search
CPC .............. F16C 11/0604; F16C 2223/00; F16C 2240/60; F16C 2300/02; B23P 15/00; B23P 2700/11
See application file for complete search history.

(56) References Cited

U.S. PATENT DOCUMENTS

| | | | | |
|---|---|---|---|---|
| 3,746,408 | A | * | 7/1973 | Wachter .............. F16C 11/0685 384/207 |
| 5,150,981 | A | * | 9/1992 | Miwa .................. F16C 11/0604 29/898.052 |
| 6,802,916 | B2 | * | 10/2004 | Rateick, Jr. .............. F04B 1/126 72/340 |
| 7,025,182 | B2 | * | 4/2006 | Rateick, Jr. .............. B21K 1/76 188/250 G |
| 8,573,877 | B2 | * | 11/2013 | Pape .................. F16C 11/0604 403/122 |
| 9,175,720 | B2 | * | 11/2015 | Adamczyk .......... F16C 11/0604 |
| 2003/0000603 | A1 | * | 1/2003 | Rateick, Jr. .............. B23P 15/00 148/674 |
| 2013/0071175 | A1 | * | 3/2013 | Adamczyk .......... F16C 11/0604 403/122 |

FOREIGN PATENT DOCUMENTS

| | | |
|---|---|---|
| CN | 102996618 A | 3/2013 |
| CN | 102996619 A | 3/2013 |
| DE | 102 06 499 A1 | 8/2003 |
| DE | 10 2009 011 978 A1 | 9/2010 |
| DE | 10 2011 082 920 A1 | 3/2013 |
| DE | 10 2011 082 921 A1 | 3/2013 |
| EP | 2 239 087 A1 | 10/2010 |
| WO | 2007/148359 A1 | 12/2007 |

OTHER PUBLICATIONS

Weng Binghua, "Improvment In Productive Technology of Global Head Dowel", Journal of Guangdong Institute of Technology, Jun. 1995, vol. 12, No. 2, pp. 123-126 (4 pp., English abstract provided).

Office Action dated Apr. 19, 2021 in corresponding Chinese Application No. 201880041066.1; 14 pages including English-language translation.

International Preliminary Report on Patentability with English-language translation of the Written Opinion dated Jan. 9, 2020 in corresponding International Application No. PCT/EP2018/064607; 7 pages.

Examination Report dated Oct. 31, 2018 in corresponding German application No. 10 2017 210 976.9; 14 pages.

International Search Report dated Aug. 21, 2018 in corresponding International application No. PCT/EP2018/064607; 28 pages.

* cited by examiner

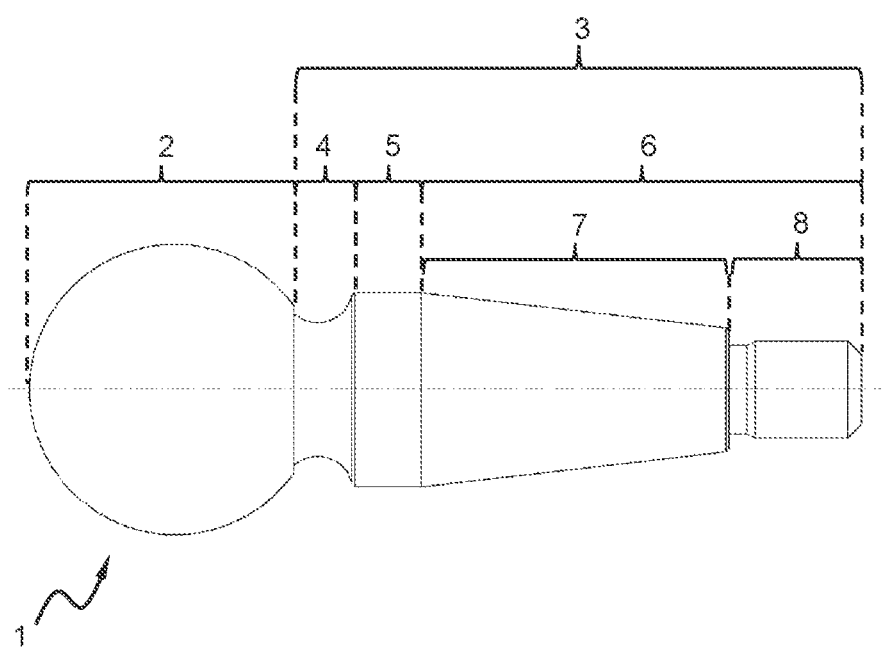

METHOD FOR PRODUCING A BALL STUD

The present disclosure relates to a method for producing a ball stud.

BACKGROUND

Such methods are used for producing a ball stud consisting of a shank with a joint ball attached at an axial end. In the process, it is necessary to optimize the ball stud with regard to its surface properties, in particular the resistance to corrosion, and its hardness properties with a view to the concrete application case. Currently, the ball studs (except for the thread region) are completely carbonitrided and oxidized. The low elongation at fracture value of the treated surface is disadvantageous. Due to high-load events, already in the case of slight elastic deformations, cracking of the surface coating in the highly-stressed neck region between joint ball and shank can occur. This incipient cracking can then propagate and lead to component failure. In order to prevent this, in particular, the neck region is currently dimensioned sufficiently large so that no incipient cracking occurs.

WO 2007/148359 A1 describes a method for producing a ball stud with the steps of plastically deforming a blank designed as a metal disk in order to generate a shank and a joint ball and carrying out a fine machining on an outer surface of the ball stud in order to reduce the roughness.

The generic DE 10 2009 011 978 A1 discloses a method for producing a ball stud with an anti-corrosion surface coating, including a joint ball and a shank, wherein the ball stud, viewed in axial direction, is subdivided into several zones, wherein the zones are each provided with a surface coating taking into consideration their stressing and adjusted thereto, including the method steps a) production of the ball stud; b) subdividing of the ball stud, viewed in axial direction, into different zones; c) zone-wise application of an anti-corrosion surface coating by means of a thermal injection method, wherein the zones are each provided with a surface coating taking into consideration their stressing and adjusted thereto.

The aim of the present disclosure is to provide a process-reliable method for producing a light-weight ball stud.

SUMMARY

A method for producing a ball stud with a joint ball and a shank, wherein the shank comprises at least a neck region adjoining the joint ball and a fastening section opposite the joint ball, including:

a) plastically shaping a semi-finished ball stud product;
b) mechanically machining, in particular cutting machining, the semi-finished ball stud product;
c) rolling the surface of the joint ball;
d) thermochemically hardening the surface of the semi-finished ball stud product;
e) removing the surface-hardened layer at least in the neck region and/or the fastening section;
f) oxidizing the semi-finished ball stud product;
g) polishing the joint ball.

After the entire ball stud has been treated by the thermochemical surface hardening process, by the subsequent removal of the surface-hardened layer in the corresponding regions and the oxidation, the mechanical properties and the corrosion properties can be influenced in a targeted manner. Thus, the surface-hardened and oxidized regions have a high resistance to wear and good corrosion protection, while the oxidized regions with removed surface-hardened layer are characterized by high ductility and by sufficient corrosion protection. In particular, a high resistance to wear and corrosion is necessary for the joint ball, while the neck region and the fastening section can also get by with a lower resistance to wear and corrosion. As a result, an ideal ball stud is obtained, which has a hard, abrasion-resistant joint ball with optimal protection against corrosion and wear, while the shank has mainly a ductile surface which is not subject to incipient cracking under high stresses. The requirement of corrosion resistance in the shank is clearly lower, so that here an oxidation of the non-thermochemically hardened surface is sufficient. The listing of the method steps moreover does not represent a stipulation of their precise sequential order. Where possible, individual steps can also be switched. Naturally, the method starts with the shaping of the semi-finished ball stud product and its rough machining. However, for example, the joint ball can also be rolled before the polishing of same. Alternatively, the polishing of the joint ball can also occur after the surface hardening of the semi-finished ball stud product. The oxidizing of the semi-finished ball stud product can occur before or after the removal of the surface-hardened layer, at least in the neck region and/or the fastening section.

In a preferred embodiment, the plastic shaping occurs by forging.

In a preferred embodiment, in an additional step, a thread is shaped in the fastening section. In a particularly preferred embodiment, the thread is shaped by thread rolling.

In a preferred embodiment, the surface-hardened layer is removed by cutting. For this purpose, lathing or grinding can be considered, among others.

In a preferred embodiment, at least 25 μm of the surface-hardened layer are removed.

In a preferred embodiment, the surface hardening is a carbonitriding.

In a preferred embodiment, in an additional step, a thermal hardening, in particular an induction hardening, occurs.

Additional details and advantages of the invention result from the following description of a preferred embodiment example in reference to the drawing.

BRIEF DESCRIPTION OF THE DRAWING

FIG. 1 shows a ball stud.

DETAILED DESCRIPTION

The ball stud 1 consists substantially of joint ball 2 and shank 3. The shank 3 in turn consists, starting from the joint ball 2, of neck region 4, cylindrical region 5 and fastening section 6, wherein the fastening section 6 in turn consists of conical region 7 and fastening region 8. In the method according to the invention for producing the ball stud 1, first a semi-finished ball stud product is forged from a blank. Subsequently, the regions mentioned at the beginning are carved out by machining, preferably cutting machining. The surface of the joint ball 2 is rolled in the process. The semi-finished ball stud product is carbonitrided as a whole, wherein, in a next step, at least 25 μm of the carbonitrided layer in the neck region 4, the cylindrical region 5 and the thread region 8 are removed by cutting. Thus, the joint ball 2 and the conical region 7 are still provided with a carbonitrided marginal layer. In the thread region 8, a thread is shaped, and the joint ball 2 is polished. The entire semi-finished ball stud product is oxidized at the end of the method.

LIST OF REFERENCE NUMERALS

1 Ball stud
2 Joint ball
3 Shank
4 Neck region
5 Cylindrical region
6 Fastening section
7 Conical region
8 Thread region

The invention claimed is:

1. A method for producing a ball stud with a joint ball and a shank, wherein the shank comprises at least a neck region adjoining the joint ball and a fastening section opposite the joint ball, wherein:
   a) plastically shaping a semi-finished ball stud product;
   b) mechanically machining the semi-finished ball stud product;
   c) rolling the surface of the joint ball;
   d) thermochemically hardening the surface of the semi-finished ball stud product;
   e) removing the surface-hardened layer at least in the neck region and/or the fastening section;
   f) oxidizing the semi-finished ball stud product; and
   g) polishing the joint ball.

2. The method according to claim 1, wherein the plastic shaping occurs by forging.

3. The method according to claim 2, wherein, in an additional step, a thread is shaped in the fastening section.

4. The method according to claim 2, wherein the surface-hardened layer is removed by cutting.

5. The method according to claim 2, wherein, in an additional step, a thermal hardening occurs.

6. The method according to claim 2, wherein the thermochemical surface hardening is a carbonitriding.

7. The method according to claim 2, wherein, in an additional step, a thermal hardening occurs.

8. The method according to claim 1, wherein, in an additional step, a thread is shaped in the fastening section.

9. The method according to claim 8, wherein the surface-hardened layer is removed by cutting.

10. The method according to claim 8, wherein, in an additional step, a thermal hardening occurs.

11. The method according to claim 8, wherein the thermochemical surface hardening is a carbonitriding.

12. The method according to claim 8, wherein, in an additional step, a thermal hardening occurs.

13. The method according to claim 1, wherein the surface-hardened layer is removed by cutting.

14. The method according to claim 13, wherein, in an additional step, a thermal hardening occurs.

15. The method according to claim 13, wherein the thermochemical surface hardening is a carbonitriding.

16. The method according to claim 1, wherein at least 25 μm of the surface-hardened layer are removed.

17. The method according to claim 16, wherein the thermochemical surface hardening is a carbonitriding.

18. The method according to claim 1, wherein the thermochemical surface hardening is a carbonitriding.

19. The method according to claim 1, wherein, in an additional step, a thermal hardening occurs.

20. The method according to claim 19, wherein the thermal hardening occurs as induction hardening.

* * * * *